(No Model.)
J. HOBBS.
APPARATUS FOR MANUFACTURING ARTIFICIAL BUTTER.
No. 271,243. Patented Jan. 30, 1883.
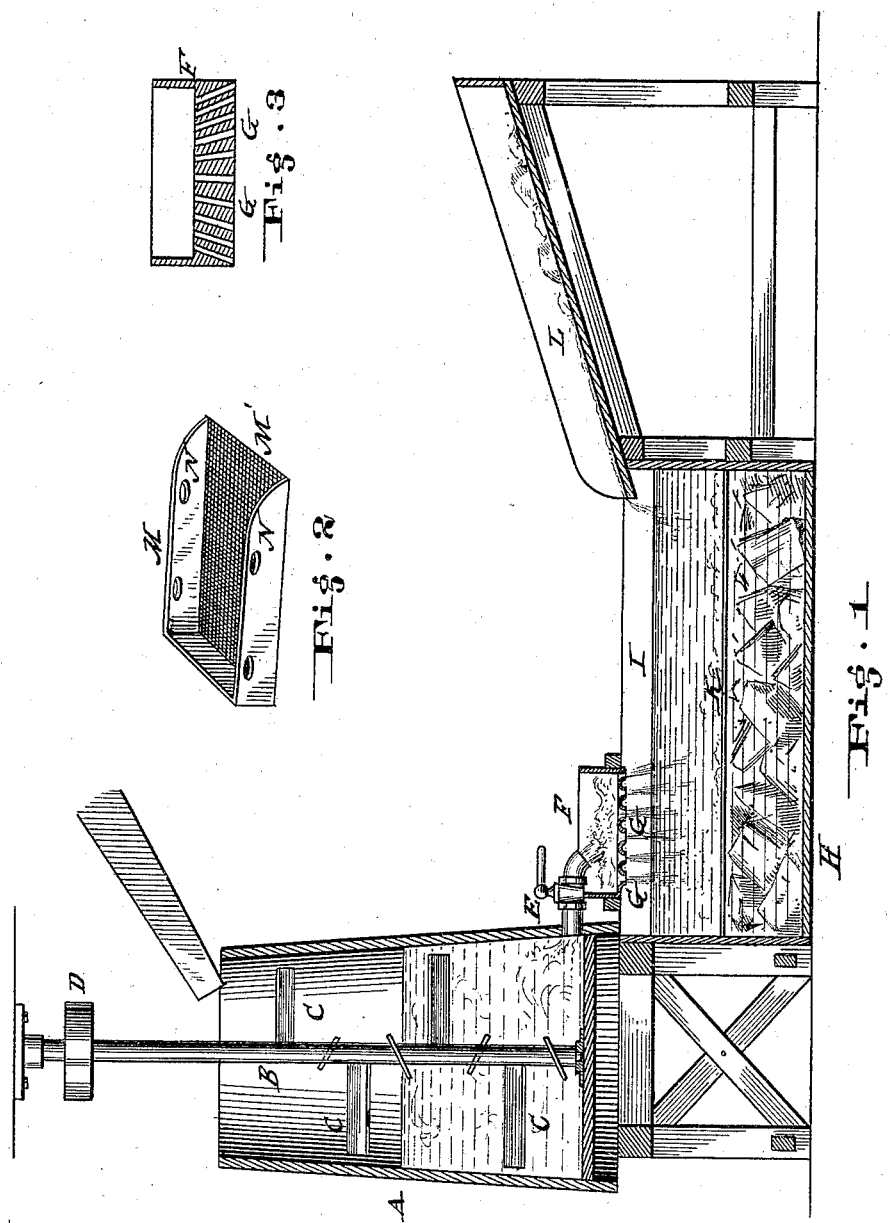

UNITED STATES PATENT OFFICE.

JOHN HOBBS, OF BOSTON, MASSACHUSETTS.

APPARATUS FOR MANUFACTURING ARTIFICIAL BUTTER.

SPECIFICATION forming part of Letters Patent No. 271,243, dated January 30, 1883.

Application filed December 12, 1882. (No model.)

*To all whom it may concern:*

Be it known that I, JOHN HOBBS, of the city of Boston, in the county of Suffolk and State of Massachusetts, have invented an Improvement in Apparatus for Manufacturing Artificial Butter, of which the following is a specification.

My invention has reference to apparatus for the manufacture of artificial butter, or what is generally known as "oleomargarine butter;" and it consists in the combination of a churn in which to make the emulsion, a dividing tank or tray by which the emulsion is subdivided into small streams, a cooler in which the ice is held in a separate compartment from the clear cold water into which the emulsion falls, an inclined receiving and draining table, the end of which preferably guides the drainings back into the cooling-tank, and a ladle to remove the solidified emulsion from the cooling-tank to the receiving-table, the said ladle having a perforated bottom, and in minor details, all of which is more fully set forth in the following specification and shown in the accompanying drawings, which form part thereof.

Heretofore it has been customary to cause the emulsion to flow in one large stream into a box or tank containing broken ice, and which during the influx of the emulsion was constantly moved about by shovels to present fresh surfaces of the ice to the liquid artificial butter it is designed to solidify. After the emulsion or butter has been solidified it is shoveled out, accompanied by the ice with which it is mixed, and laid upon large tables distant from the ice-tank, where the ice is picked out by hand, leaving the butter in condition to be packed or put up into prints in the usual manner.

The main objections to the above method of solidifying the emulsion are that it is not quickly cooled, the cooling substance (ice) is lost after being once used, and great labor and loss of time is the result.

The object of my invention is to overcome the above objectionable features by providing apparatus capable of reducing the time required for cooling, preventing any waste of the cooling-liquid, having no separation to make after the emulsion has been solidified and deposited upon the table, and the general reduction of time and labor necessary to accomplish by my improved apparatus what has heretofore been accomplished by the old apparatus referred to above.

In the drawings, Figure 1 is a sectional elevation of apparatus embodying my improvement. Fig. 2 is a perspective view of the ladle, and Fig. 3 is a sectional elevation of one form of a device by which the emulsion is caused to flow in small streams.

A is the churn, which may be of any of the well-known constructions; but I prefer it to be made substantially as shown, in which B is a vertical rotating shaft, having a pulley, D, at the top and oblique blades or beaters C on that part of said shaft which is located within the cylinder of the churn, and these beaters are so arranged that this obliquity is opposed to each other, so as to churn the emulsion up and down as well as around.

E is a tap by which the emulsion is run off from the churn into the dividing-tank F, which tank has a bottom, F', provided with a series of small holes, G, so arranged that the emulsion will run through said holes and fall into the water in tank I in small streams. This dividing-tank may have its bottom made with small projecting rims or lips around the under edge of the holes; or the bottom F' may have considerable thickness and be perforated with slightly-diverging holes G, as shown in Fig. 3.

I do not limit myself to any particular construction of dividing-tank, the main feature being that the emulsion must be subdivided, and must not be allowed to run together again.

The cooling-tank H is divided into compartments I J by a grate-screen, K, which holds the ice down and leaves a clear body of water above, as shown, and into which the divided emulsion falls.

If desired, the division K may be vertical, and two or more compartments may be used.

The solidified emulsion floats upon the cold water in tank H, and is scooped up or ladled out by the ladle M, Fig. 1, having a perforated bottom, M', and two handles, N, on each side thereof, by which a man on each side of tank H uses said ladle to remove the solidified butter and separate it from the water upon which it floats and discharges it upon the inclined table L, where any water may be drained off and run down the inclined surface of the table into the cold-water tank, into or over which the end of the table extends.

I do not claim in this application the process nor the details of construction of each of the parts, but limit myself to the apparatus as a whole.

Having now described my invention, what I claim as new, and desire to secure by Letters Patent, is—

1. The herein-described apparatus for the manufacture of artificial butter, which consists of the combination of the churn, means to divide the emulsion into small streams, an ice-water tank in which there is a clear body of water, and an inclined receiving and draining table, substantially as set forth.

2. The combination of churn A, dividing-tank F, tank H, having grate K, ladle M, and receiving-table L, substantially as and for the purpose specified.

3. The combination of dividing-tank F, an ice-water tank having a clear body of water, and inclined receiving-table, substantially as set forth.

In witness whereof I have hereunto set my hand.

JOHN HOBBS.

Witnesses:
WM. B. H. DOWSE,
JAS. A. MCGEOUGH.